TELEPHONE SYSTEM OF THE RELAY TYPE

Filed June 18, 1953 4 Sheets-Sheet 1

Inventors:
Friedrich Spiecker &
Fritz Lubberger (deceased)
by Emma Lubberger
(sole heir).
By [signature]

Aug. 5, 1958 F. SPIECKER ET AL 2,846,510

TELEPHONE SYSTEM OF THE RELAY TYPE

Filed June 18, 1953 4 Sheets-Sheet 2

Inventors
Friedrich Spiecker &
Fritz Lubbergen (deceased)
by Emma Lubbergen
(sole heir).

By [signature] Att'y

INVENTORS
FRIEDRICH SPIECKER &
FRITZ LUBBERGER; deceased,
by Emma Lubberger, sole heir by Att'y Aug. 5, 1958 F. SPIECKER ET AL 2,846,510

TELEPHONE SYSTEM OF THE RELAY TYPE

Filed June 18, 1953 4 Sheets-Sheet 4

INVENTORS
FRIEDRICH SPIECKER &
FRITZ LUBBERGER; deceased,
by Emma Lubberger, sole heir by [signature]

Att'y

United States Patent Office 2,846,510

Patented Aug. 5, 1958

2,846,510

TELEPHONE SYSTEM OF THE RELAY TYPE

Friedrich Spiecker, Berlin-Charlottenburg, Germany, and Fritz Lubberger, deceased, late of Emmendingen, Germany, by Emma Lubberger, sole heir, Emmendingen, Germany, assignors to Siemens & Halske Aktiengesellschaft, Munich and Berlin, Germany, a corporation of Germany Application June 18, 1953, Serial No. 362,442

Claims priority, application Germany January 9, 1950

20 Claims. (Cl. 179—18)

Figure 1:
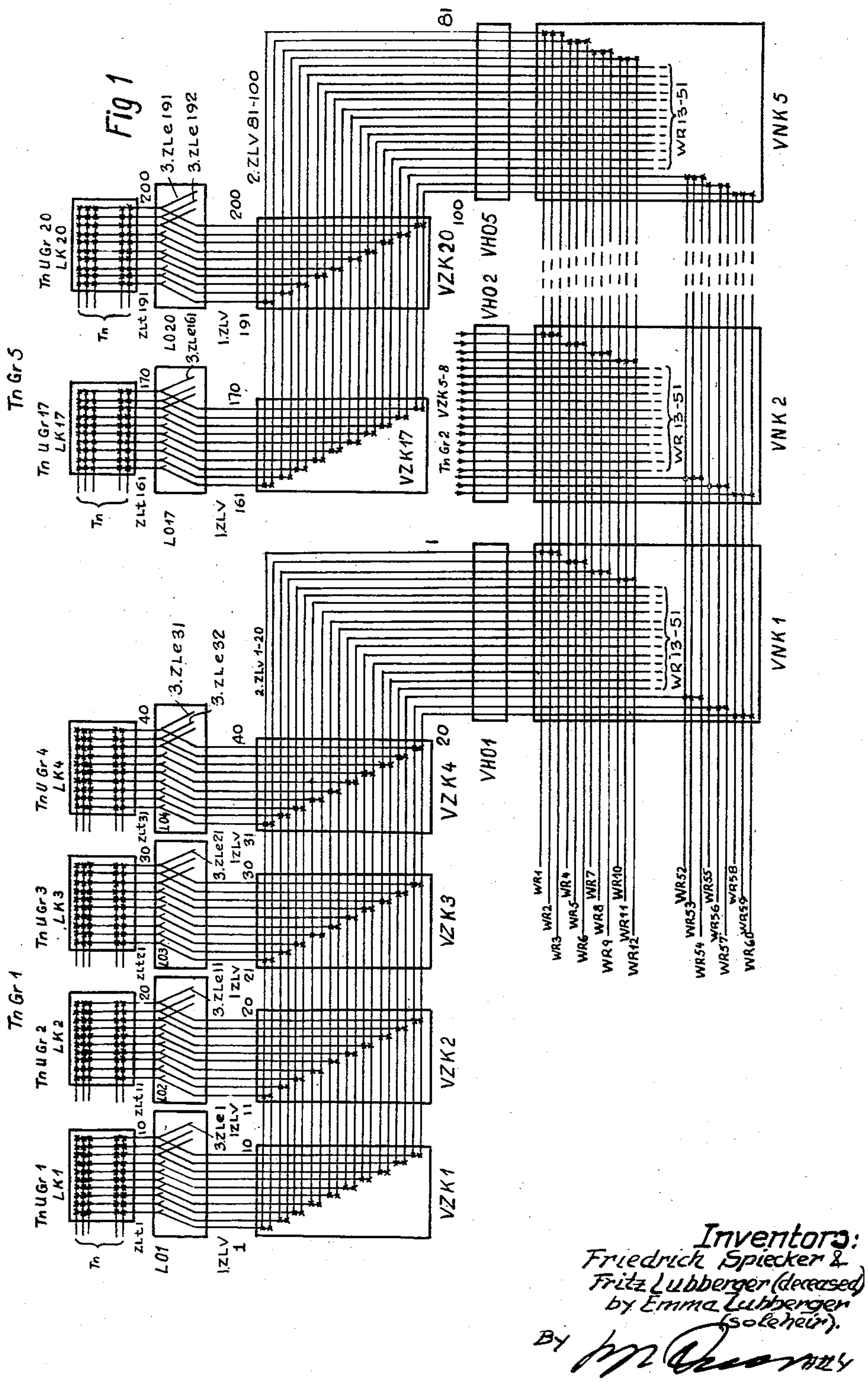

This invention relates to telecommunication and is particularly concerned with a telephone system employing relay selectors.

In signal communication, particularly telephone systems, optimum utilization of the trunk lines and linking equipment is obtained if a large number of them can be made available to a large group of incoming lines for common use. In large exchanges, therefore, the subscribers' lines are combined into main groups of 1000 or 2000 lines each. Each subscriber's line of such a main group is given access, by means of a dual preselection, to each of the first group selectors available to the group as a whole.

The invention relates to telecommunication, particularly telephone systems employing relay selectors. The object of the invention is to obtain also in this case the most complete possible utilization of the linking equipment connectible with calling subscribers' lines; and the invention accomplishes this by making it possible for each line of any subgroup, from among the groups combined into a main group of incoming lines, to be connected with any of the linking devices, associated with the main group as a whole, by means of at least three linking devices consisting exclusively of connecting relays, while allotters arranged between the individual connecting devices determine which of the links is to be used at a given time in establishing the call connection.

In one known system, a main group of 1000 subscribers' lines has associated therewith a large number (80) of trunk lines to which dial pulse registers are connected. The trunk lines are subdivided into a plurality of junction groups. The main group of subscribers' lines is subdivided into 20 groups of 50 lines each. To each group is available a definite number (6) of primary links. Each primary link has access to two secondary links. In order to obtain in this system as uniform a distribution of the traffic as possible, the relatively few (12) secondary links accessible to a group of 50 subscribers' lines are multipled with an equal number (12) of trunk lines from the individual junctions by means of cross-connecting jumpers. In this system, each subscriber's line does not have access to each linking device. Thus it may happen that notwithstanding availability of idle trunk lines, a calling subscriber may not be able to reach one of them. This disadvantage is avoided by the present invention.

The accompanying drawings illustrate two embodiments of the invention, but the latter is not limited to these embodiments. For heavier or lighter traffic, the grouping of the links may be varied. The number of links in the individual groups and subgroups may vary. Furthermore, it is possible to use more than three connecting fields in series.

Figure 2:
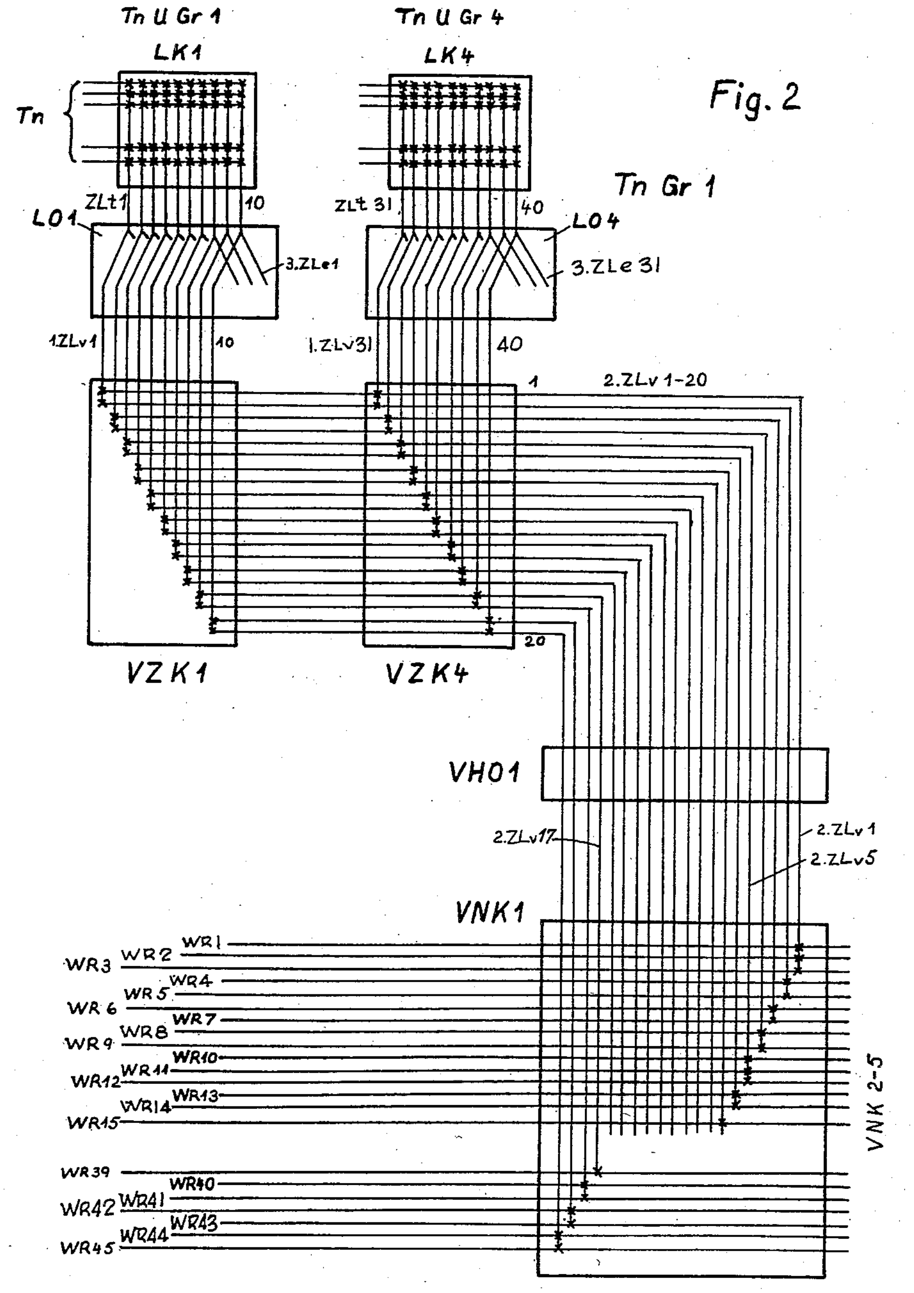
Figure 3A:
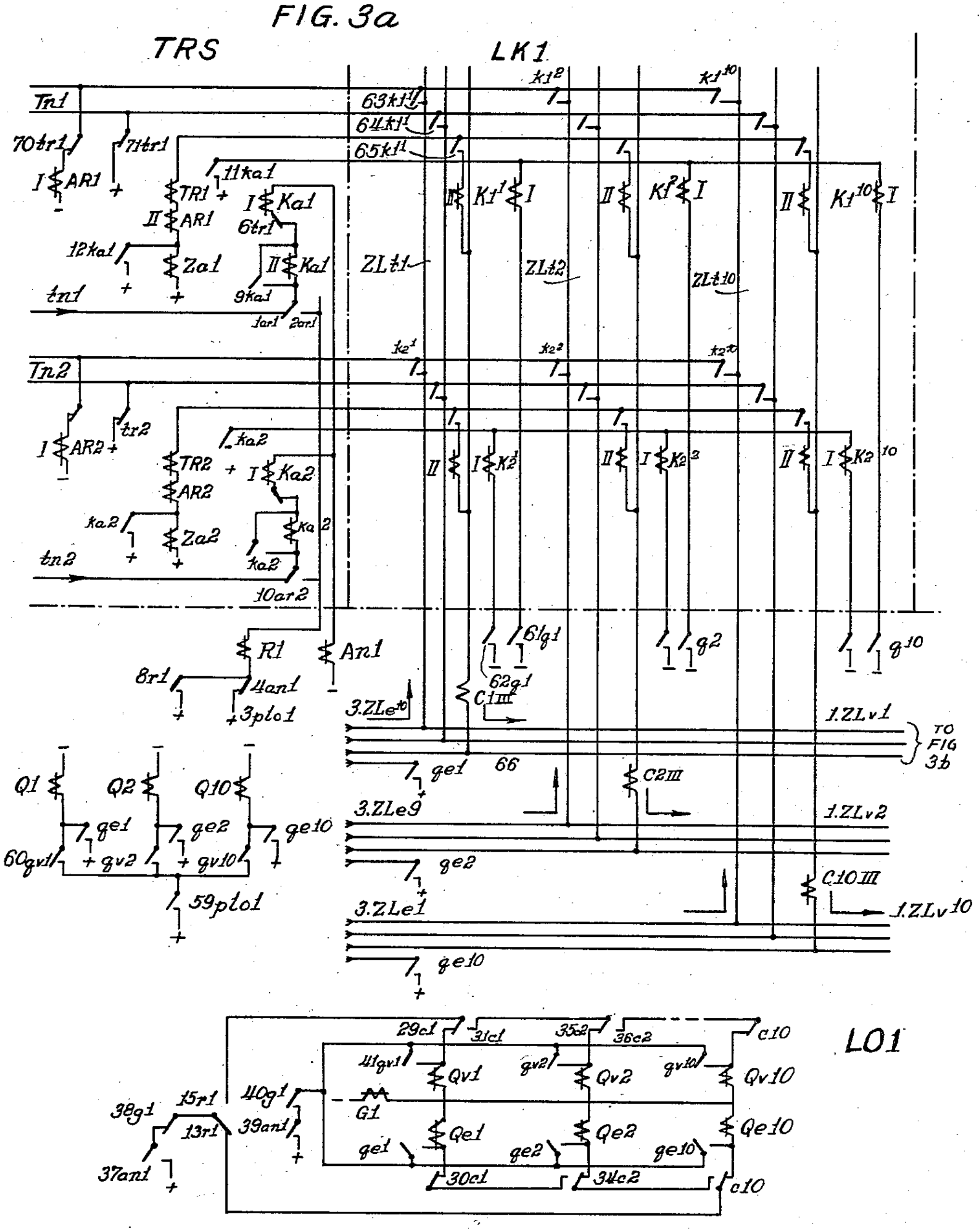
Figure 3B:
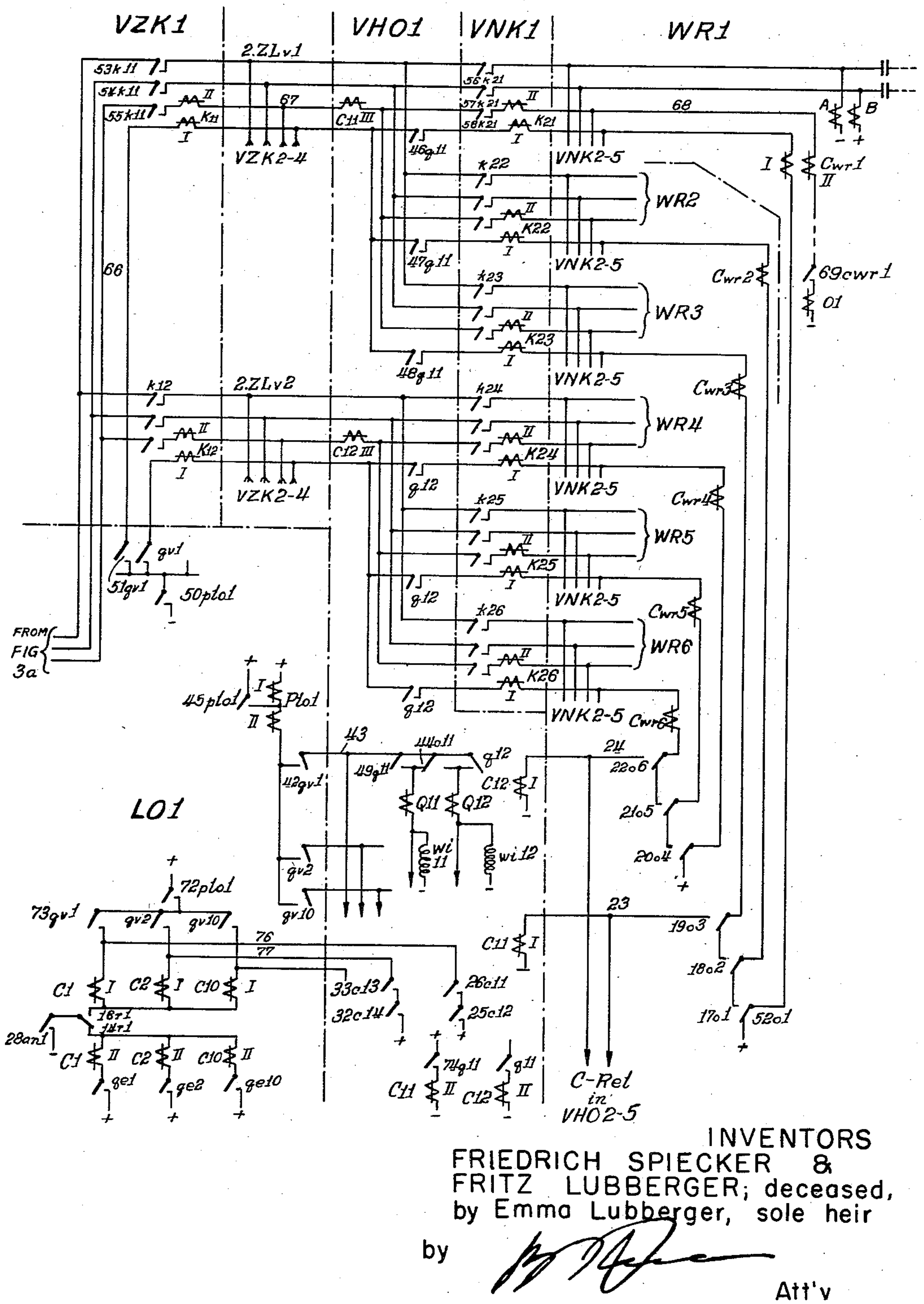

Figs. 1 and 2 illustrate grouping schemes for the preselection stage of a main group of 1000 subscribers' lines; and Figs. 3*a* and 3*b*, placed side by side with marked lines in alignment, show the circuit for the finders and allotters of the preselection stage.

It is assumed that the subscribers' lines are combined in subgroups of 50 lines each. Four such subgroups constitute one group. Fig. 1 shows subgroups T*n*UG*r*1 to T*n*UG*r*4 that constitute group T*n*G*r*1, and also shows subgroups T*n*UG*r*17 and T*n*UG*r*20 forming part of group T*n*G*r*5.

Each subgroup has associated therewith a line finder LK through which the subscribers' lines can be coupled with subscribers' links ZL*t*. For a predetermined amount of traffic, the 50 subscribers' lines of a subgroup require 10 links. The subscribers' links are two-way links, that is they are used for both incoming and outgoing traffic. Not all subscribers' links need be two-way, but some (for example two) may serve exclusively for outgoing traffic and some (for example two) solely for incoming traffic.

The making-available of an idle subscriber's link takes place in link allotters LO, one of which is associated with each subgroup of lines. In the link allotter, each two-way link divides into two branches. One branch is provided for outgoing traffic; it constitutes the first link of the preselection stage and is designated 1.ZL*v*. The other branch constitutes the last link of the final selection stage. If three linking stages are required for the final selection stage, then this second branch constitutes a link 3.ZL*e*; it has been indicated in all link allotters shown in the drawings. In incoming traffic, the subscribers' links are called into play in the reverse sequence to that applying to outgoing traffic. Therefore, the incoming-traffic branch of link ZL*t*10 constitutes link 3.ZL*e*1, the branch of ZL*t*9 is 3.ZL*e*2, and so forth.

The main group of subscribers' lines as a whole has sixty switching devices WR1 to WR60 allotted thereto. These switching devices, hereinafter referred to as selector relay sets, include the feed and impulse bridges. A selector relay set used by a calling subscriber's line is connected by a finder to a digit pulse register (translator). This register consists of groups of digit storing relays controllable by dial impulses. The selector relay sets, finders, translators, etc. of the dialing circuit are not shown in the drawings as the invention is concerned only with the preselection stage up to the selector relay sets. Suffice it to say that in installations comprising more than 1000 subscribers' lines, the connections, apart from the preselection stage, are advantageously built up in two selection stages, viz., a group selection stage and a final selection stage.

To insure maximum utilization, each of the sixty selector relay sets associated with the main group of subscribers' lines must be accessible to any subscriber's line regardless of the group or subgroup to which the line belongs. In the embodiment illustrated in the drawings, this is accomplished by giving each primary link 1.ZL*v* access to two groups of selector relay sets WR, but not to all sets, via two connecting fields, viz., a preselection primary finder VZK and a preselection final finder VNK. The saving of connecting relays brought about by the invention is so substantial as to have a noticeable effect upon the cost of the installation as a whole.

If each primary link, that is, each 1.Z1*v*, were to be given access through a connecting field to all selector relay sets, each link 1.ZL*v* would have to have sixty connecting relays. With 20 subgroups of subscribers' lines each having 10 primary links, making a total of 200 links 1.ZL*v*, this would require as many as 12,000 connecting relays. To these must be added the connecting relays required in the line finders.

An installation requiring, in the preselection stage alone, 22 connecting relays for each subscriber's line, viz., 10 relays provided for the individual lines in the line finder, and 12 relays constituting its share in the 12,000 connecting relays of the second preselection stage, certainly is far from economical.

The number of connecting relays is reduced very substantially—to 10%—by giving each primary link 1.ZL*v* access through a connecting field to only a limited number of selector relay sets. With 60 selector relay sets being required to cope with the presupposed volume of traffic, if each subscriber is to be able to reach all selector relay sets, and if a subgroup of lines has ten links 1.ZL*v* available, each 1.ZL*v* link must be able to reach a group of six selector relay sets. With 200 primary links this calls for 1200 connecting relays.

The use, according to the invention, of at least two connecting fields apart from the line finders, results in an even further reduction of the number of connecting relays. In the installation according to Fig. 1, a total of only 700 connecting relays is required for the second and third stages of preselection in a group of 1000 lines. This amounts to only 0.7 relay per subscriber.

For each group of lines, there are provided 20 secondary links (group links) 2.ZL*v*. Thus, group T*n*G*r*1 has links 2.ZL*v*1 to 2.ZL*v*20, and group T*n*G*r*5 has links 2.ZL*v*81 to 2.ZL*v*100. Accordingly, there are twice as many group links 2.ZL*v* per group of lines as there are primary links 1.ZL*v* per subgroup.

The selector relay sets WR are subdivided into as many groups as there are group links per group of lines, that is, 20 in the present case. Accordingly, with 60 selector relay sets, each group link has access to a group consisting of three selector relay sets. For example, link 2.ZL*v*1 of group T*n*G*r*1, link 2.ZL*v*81 of group T*n*G*r*5, and links 2.ZL*v*21, 2.ZL*v*41 and 2.ZL*v*61 (the last three not shown) of groups T*n*G*r*2, T*n*G*r*3 and T*n*G*r*4, respectively, have access to selector relay sets WR1 to WR3; links 2.ZL*v*2, 2.ZL*v*82, etc., have access to WR4 to WR6, and so forth. The connection of a group link 2.ZL*v* to a selector relay set is effected in a finder VNK, one of these being provided per group of lines. Thus, group T*n*G*r*1 has finder VNK1, group T*n*G*r*2 has finder VNK2, and group T*n*G*r*5 has finder VNK5 associated therewith.

Each primary link 1.ZL*v* has access to two group links 2.ZL*v*; for example, primary link 1.ZL*v*1 to group links 2.ZL*v*1 and 2.ZL*v*2. Now since, as explained above, each group link 2.ZL*v* can reach three selector relay sets, each 1.ZL*v* link has access to six sets. Each 1.ZL*v* link of a subgroup reaches a different pair of group links. This has the result that each subscriber's line can be connected with any one of the sixty selector relay sets accessible to the totality of the subscriber groups.

Each preselection primary finder VZK has 10×2, or 20 connecting relays. With five times four finders VZK this amounts to 400 relays. Each preselection final finder VNK of the five line groups has 20×3 or 60 connecting relays, so that there are a total of 300 connecting relays in the preselection final finders. Thus, as already mentioned, a total of only 400 plus 300, or 700 relays is required for all preselection primary and final finders of a main group of lines.

Between the preselection final finder VNK of each group and the preselection primary finders VZK of the same group, an allotter VHO is interposed, serving to control the availability of the group links 2.ZL*v*. By controlling blocking relays in the link allotters LO of each subgroup T*n*UG*r*, the allotter VHO prevents an idle primary link, such as 1.ZL*v*1, from being made available even though the associated group links 2.ZL*v*1 and 2.ZL*v*2 may be idle, whenever the selector relay sets WR1 to WR6 accessible to these group links are in use by subscribers from other line groups and are thus blocked.

How this is done specifically, will be explained with reference to Figs. 3*a* and 3*b*.

For traffic that is heavier or lighter than that forming the basis of the telephone system according to Fig. 1, the number of group links available to a subscriber group will not always be a straight multiple of the number of primary links 1.ZL*v* assigned to a subgroup of subscribers' lines. Also, to carry the traffic of a main group of subscribers' lines may require a number of selector relay sets which again is not a straight multiple of the number of group links of a line group.

For example, to cope with a certain amount of traffic, one main group of lines may require 45 selector relay sets. For each line group, 15 group links 2.ZL*v* must be provided. All line subgroups would be equipped uniformly with primary links, and even those subgroups which carry but light traffic, would have 10 primary links 1.ZL*v*.

Now it would be possible to give each group link access to three selector relay sets, but this would require that five of the ten primary links be coupled in the preselection primary finder with one group link each, while the other five links would have to be coupled with two group links each. Such grouping, however, is undesirable from the point of view of back-blocking, because the primary links 1.ZL*v* connectible with but one group link will frequently be blocked since these group links will be in use by subscribers' lines from other subgroups.

Therefore, according to the invention, the number of group links is increased above the number inherently required, so that each primary link 1.ZL*v* has access to at least two group links 2.ZL*v*. Thus, instead of fifteen, there are twenty group links. The five links that would not theoretically be needed to cope with the traffic, have the further effect of preventing blocking of the traffic in one group by back-blocking from the other groups. The number of group links is a straight multiple (2) of the number of primary links per subgroup. The twenty group links will then have access to the 45 selector relay sets. How the latter are assigned to the group links is illustrated in Fig. 2. Five group links, for example 2.ZL*v*1, 2.ZL*v*5, 2.ZL*v*9, 2.ZL*v*13 and 2.ZL*v*17, are given access to three selector relay sets each while each of the remaining fifteen group links will have access to two selector relay sets. The connecting relays required for each line group with this manner of grouping are as follows:

In the four preselection primary finders, there are 4×2×10 or 80 connecting relays; the preselection final finder of this line group contains 15×2 plus 5×3, or a total of 45 relays; thus, the total is 125 connecting relays for a group of 200 lines.

This number of connecting relays for a group of 200 lines is but insignificantly higher than the number that would be required in the above-mentioned arrangement with 15 group links, since the number of connecting relays in the preselection final finder would again be 45, as each of the 15 group links must be equipped with three connecting relays. Each preselection primary finder would require only 15 connecting relays since the ten primary links 1.ZL*v* have access to only 15 group links; thus, the total for the four preselection primary finders of a group would be 60. Accordingly, for 20 group links, the increase in connecting relays required for the 200 subscribers of a group is only 20. This slight increase is fully justified by the considerable reduction of the frequency at which primary links 1.ZL*v*, although themselves idle, will be blocked by traffic in other line subgroups.

If 43 selector relay sets are required to cope with the traffic of a line group, 17 groups can be formed with two relay sets each, and three groups with three relay sets each. In that case, three of the twenty group links 2.ZL*v*, for example, the 1st, 8th and 15th, would have access to three relay sets each, while the remaining seventeen links have access to two selector relay sets each.

Thus, according to the invention, the most favorable conditions are obtained by giving each primary link 1.ZL$v$ access to at least two group links and by subdividing those selector relay sets which are at the disposal of an entire main group of subscribers' lines consisting of a plurality of line groups, into groups of as nearly as possible equal size, so that the number of selector relay sets for the individual groups does not differ by more than one.

Fig. 3$a$ shows the equipment of two subscribers' lines T$n$1 and T$n$2. Assume a call is made effective on line T$n$1. Loop closure upon lifting the receiver, operates the line relay AR1 in the subscriber relay set TRS. Contact 1$ar$1 of this relay disconnects the control lead $tn$1 from the line contact bank of the circuit of the final selection stage, while contact 2$ar$1 of the relay AR1 closes the following circuit:

(1) Plus, contacts 3$plo$1, 4$an$1, relay R1, lead 5, contact 2$ar$1, winding II of finder starting relay K$a$1, contact 6$tr$1, winding I of relay K$a$1, lead 7, relay A$n$1, Minus.

Relay R1 closes a holding circuit at contact 8$ar$1 that is independent of contact 4$an$1. The finder starting relay K$a$1 by its contact 9$ka$1 short-circuits its own winding II and thus prevents a new finder start from being initiated in the event that prior to connection of line T$n$1 to one of the selector relay sets another call should come in on another line such as T$n$2. If relay AR2 were to operate and close contact 10$ar$2, the finder starting relay K$a$2 could not operate since short-circuiting of the high-resistance winding II of relay K$a$1 diverts the current from relay K$a$2. Closure of contact 11$ka$1 produces the finder start by connecting positive battery to the windings I of all connecting relays $K1^1$, $K1^2$ . . . $K1^{10}$ of line T$n$1. Contact 12$ka$1 prepares the holding circuit that is to be completed after switching through to one of the selector relay sets.

The relay R1 of the link allotter LO1 is the direction-indicating relay. Its actuation indicates that the finder start originates from a calling line, so that an outgoing connection is to be established in which that branch of the selected subscriber's link ZL$t$ which constitutes a primary link 1.ZL$v$ of the preselection stage, is to be switched through. The indication of direction takes place through opening of contacts 13$r$1 and 14$r$1, and closure of contacts 15$r$1 and 16$r$1. This causes cutting out of those relays (Q$e$1, Q$e$2, etc.) and relay windings (C1II, C2II, etc.) which are to be effective in incoming calls only. At the same time those relays (Q$v$1, Q$v$2, etc.) and relay windings (C1I, C2I, etc.) are made effective which are required for completing outgoing connections. Operation of relay A$n$1 initiates the making-available of an idle subscriber's link ZL$t$.

Let us assume that the subscribers' links ZL$t$1 and ZL$t$2 are idle. As determined by a contact chain, link ZL$t$1 is the one to be used first. But before this link may be made available, it must first be ascertained whether an idle selector relay set WR can be reached through this link, or more specifically through its branch 1.ZL$v$1. As is evident from Fig. 1, branch 1.ZL$v$1 has access to two groups of selector relay sets WR1 to WR3 and WR4 to WR6. Whether one of these relay sets is idle is ascertained by relay C1, serving as a blocking relay.

If the selector relay sets WR of both groups are blocked, then the blocking contacts 17$o$1, 18$o$2, 19$o$3 of one group, and 20$o$4, 21$o$5 and 22$o$6 of the other group are closed. In all group allotters VHO1 to VHO5, blocking relays are energized by circuits by-passing the finders VNK1 to VNK5. Thus, in allotter VHO1, the blocking relays C11 and C12 are energized as follows:

(2) Plus, contacts 17$o$1, 18$o$2, 19$o$3, lead 23, winding I of relay C11, Minus;

(3) Plus, contacts 20$o$4, 21$o$5, 22$o$6, lead 24, winding I of relay C12, Minus.

In allotters VHO2 to VHO5, the blocking relays arranged parallel to relays C11 and C12 are likewise energized.

Contacts 25$c$12, 26$c$11 and 75$c$11 are closed. Relay C1 in line allotter LO1 is operated through a circuit bypassing finder VZK1, as follows:

(4) Plus, contacts 25$c$12, 26$c$11, lead 76, winding I of relay C1, contacts 16$r$1, 28$an$1, Minus.

Relay C1 opens contacts 29$c$1 and 30$c$1 and closes contact 31$c$1. Contact 30$c$1 is situated in that chain of contacts through which the subscribers' links are made available in incoming calls. It is of no significance in outgoing calls. Contacts 29$c$1 and 31$c$1 are part of the chain of contacts effective in outgoing calls. Opening of contact 29$c$1 and closing of contact 31$c$1 has the result that the idle subscriber's link ZL$t$1 will not be made available but the next link ZL$t$2 will be. In the event that the selector relay sets accessible to this link via finders VZK1 and VNK1 (that is, selector relay sets WR7 to WR12 in Fig. 1) should likewise be blocked, the relays (not shown) in allotter VHO1 corresponding to relays C11 and C12 would be operated. Contacts 32$c$14 and 33$c$13 of these latter relays (not shown) would be closed so that simultaneously with relay C1, also relay C2 in allotter LO1 would operate over conductor 77. Contacts 34$c$2 and 35$c$2 would also be open, and contact 36$c$2 would be closed. The starting chain for outgoing connections is then transferred to the next-following subscriber's link, whose finder starting relay Q$v$ is not shown.

If the selector relay sets of only one group (WR1 to WR3 or WR4 to WR6) are blocked, only one of the relays C11, C12 will be energized. Circuit (4) will not be closed, as in this case the link ZL$t$1/1.ZL$v$1 can still reach a selector relay set, such as WR4, even though selector relay sets WR1 to WR3 are blocked.

Assuming that selector relay set WR1 is idle. Relay Q$v$1 will be energized, which in the case of outgoing calls initiates the connections of the subscriber's link ZL$t$1 in both directions, that is, both with a subscriber's line and with a secondary or group link, the circuit being traceable as follows:

(5) Plus, contacts 37$an$1, 38$g$1, 15$r$1, 29$c$1, relay Q$v$1, relay G1, Minus.

The two relays close a holding circuit:

(6) Plus, contacts 39$an$1, 40$g$1, 41$qv$1, relay Q$v$1, relay G1, Minus.

Circuit (5) is opened at 38$g$1. Relay P$lo$1 is energized as follows:

(7) Plus, relay P$lo$1 (windings I and II), contact 42$qv$1, lead 43, contact 44$c$11, relay Q11, high ohmic resistance W$i$–11, Minus.

Relay P$lo$1 short-circuits its high ohmic resistance winding I at contact 45$plo$1. This causes a blocking potential to be applied to lead 43, so that until relay P$lo$1 is released (which takes place when the subscriber's line has been switched through to an idle selector relay set), the testing relay of no other link allotter of the main group can operate if during that time calls should come in and the subscribers' links ZL$t$11, ZL$t$21, etc. to ZL$t$191 which also have access to selector relay sets WR1 to WR6, should be idle. The use of these links is thus prevented as long as testing relay P$lo$1 is energized.

Relay Q11 in group allotter VHO1 closes its contacts 46$q$11, 47$q$11 and 48$q$11 which are included in the connecting circuits for selector relays sets WR1 to WR3. By means of contact 49$q$11, the relay Q11 connects itself to lead 43. At contact 74$q$11 (bottom right of Fig. 3$b$), the winding II of relay C11 is connected in the circuit.

The selector relay sets of each group are to be put to use in a predetermined sequence. Which of these sets is to be used, is determined by a chain of contacts of the blocking relays C. As selector relay set WR1 is assumed to be idle, contact 52$o$1 is closed. The following circuit then exists:

(8) Minus, contacts 50$plo$1 and 51$qv$1, winding I of connecting relay K11, contact 46$q$11, winding I of connecting relay K21, winding I of relay Cwr1, contact 52o1, plus.

Connection of link 1.ZLv1 with group link 2.ZLv1 is effected at contacts 53k11, 54k11 and 55k11. Connection of group link 2.ZLv1 with selector relay set WR1 takes place at contacts 56k21, 57k21 and 58k21. As selector relay set WR1 is idle, only this set can be used, not set WR2 or WR3 even though they should be idle, since the connecting circuits extending through the energizing windings of connecting relays K22 and K23 are not closed, contacts 17o1 and 18o2 being open.

Simultaneously with the circuit (8), the auxiliary connecting relay Q1 of subscriber's link ZLt1 is operated as follows:

(9) Plus, contacts 59plo1 and 60qv1, relay Q1, Minus. Relay Q1 applies a potential to those connecting relays of line finder LK1 which are adapted to connect the subscribers' lines with the links ZLt1. Thus, negative battery is applied by means of contacts 61q1, 62q1 to relays K1[1] and K2[1] of the illustrated subscribers' lines Tn1 and Tn2. As the finder start originates from line Tn1, connecting relay K1[1] will be operated as follows:

(10) Minus, contact 61q1, winding I of relay K1[1], contact 11ka1, Plus.

The connection is effected by closure of contacts 63k1[1], 64k1[1] and 65k1[1]. The following holding circuit is thus established:

(11) Plus, contact 12ka1, winding II of relay AR1, cut-off relay TR1, contact 65k1[1], winding II of connecting relay K1[1], winding III of relay C1, lead 66, contact 55k11, winding II of connecting relay K11, lead 67 of group link 2.ZLv1, winding III of relay C11, contact 58k21, winding II of connecting relay K21, lead 68, winding II of relay Cwr1, contact 69cwr1, blocking relay O1, Minus.

Cut-off TR1, by opening contacts 71tr1 and 70tr1, disconnects line relay AR1 from the subscriber's line and opens circuit (1) at contact 6tr1. Relays An1 and R1 in the link allotter are released. When the finder starting relay Ka1 releases, the connecting circuit (10) will be opened at contact 11ka1. Opening of contact 12ka1 causes the call meter Zä1 to be incorporated in holding circuit (11), but the meter is not actuated. The blocking relay O1 of selector relay set WR1 blocks the latter by opening contact 52o1, and it also closes contact 17o1 so as to condition the selector relay set WR2, if idle, for use in following call.

However, before these last-mentioned switching operations take place, and simultaneously with the establishment of circuit (8), a circuit through winding I of relay C1 is closed as follows:

(12) Plus, contacts 72plo1, 73qv1, winding I of relay C1, contacts 16r1, 28an1, Minus.

Relay C1 actuates the various chains of contacts controlling the finder starting relays Qv (for outgoing traffic) and Qe (for incoming traffic). However, relay Qv2 cannot operate as contact 38g1 is open.

Release of relays R1 and An1 causes interruption of the holding circuit (6) for relays Qv1 and G1. The interruption of circuit (12) has no effect upon the energized condition of relay C1, as winding III of the latter is included in holding circuit (11).

Release of relay Qv1 also results in the breaking of circuit (7). This removes the blocking potential from lead 43. Relay Q11 releases, is disconnected from lead 43, and also opens the finder starting contacts 46q11, 47q11 and 48q11.

If thereafter one of the link allotters LO2 to LO4 makes link 1.ZLv11 or 1.ZLv21 or 1.ZLv31, corresponding to link 1.ZLv1, accessible, such link can be connected only with group link 2.ZLv2, since the relay Q12, which initiates connection of this link with one of the selector relay sets WR4 to WR6, is the only one to be operated in a circuit corresponding to circuit (7), being connected to lead 43 by contact 75c11.

After selector relay set WR1 has been busied, sets WR2 and WR3, belonging to the same group, can be used by subscribers of line groups TnGr.2 to TnGr.5, as will be evident from Fig. 1. These sets are reached via the preselection final finders VNK2 to VNK5 by multiple wiring indicated in Fig. 3b as "VNK2–5."

Changes may be made within the scope and spirit of the appended claims which define what is believed to be new and desired to have protected by Letters Patent.

What is claimed is:

1. In a telephone system of the relay type wherein subscriber stations are disposed in subgroups and wherein a plurality of said subgroups are arranged to form line groups and wherein a plurality of said line groups are arranged to form a main group; a plurality of relay switching devices common to said main group for extending calls from subscriber stations belonging to such main group, preselection apparatus for connecting any calling station of any one subgroup with any one of said common switching devices, said preselection apparatus comprising at least one first and at least one second and at least one third finder, each said finder comprising exclusively coupling relays for performing the operations thereof, first trunk lines extending between said first and said second finders, second trunk lines extending between said second and third finders, and allotter means disposed respectively between said first and second finders and between said second and third finders for determining the particular trunk lines over which calls are to be extended to said common relay switching devices.

2. A system and cooperation of parts according to claim 1, wherein said first trunk lines extending between said first and said second finders are disposed nearest to the subscriber stations of a subgroup, said first trunk lines being common to all stations included in such subgroup for connecting the corresponding stations with said second finder, said second finder having access to said second trunk lines, said second trunk lines being common to all first finders of a line group.

3. A system and cooperation of parts according to claim 1, wherein said first trunk lines extending between said first and said second finders are disposed nearest to the subscriber stations of a subgroup, said first trunk lines being common to all stations included in such subgroup for connecting the corresponding stations with said second finder, said second finder having access to said second trunk lines, said second trunk lines being common to all first finders of a line group, each first trunk line being connectible in said second finder with at least two of said second trunk lines.

4. A system and cooperation of parts according to claim 1, wherein said first trunk lines extending between said first and said second finders are disposed nearest to the subscriber stations of a subgroup, said first trunk lines being common to all stations included in such subgroup for connecting the corresponding stations with said second finder, said second finder having access to said second trunk lines, said second trunk lines being common to all first finders of a line group, each first trunk line being connectible in said second finder with a number of said second trunk lines which is a multiple of the number of said first trunk lines.

5. A system and cooperation of parts according to claim 1, wherein said first trunk lines extending between said first and said second finders are disposed nearest to the subscriber stations of a subgroup, said first trunk lines being common to all stations included in such subgroup for connecting the corresponding stations with said second finder, said second finder having access to said second trunk lines, said second trunk lines being common to all first finders of a line group, each first trunk line being connectible in said second finder with at least two of said second trunk lines, each second trunk line being connectible in said third finder with at least two of said common switching devices.

6. A system and cooperation of parts according to claim 1, wherein said first trunk lines extending between said first and said second finders are disposed nearest to the subscriber stations of a subgroup, said first trunk lines being common to all stations included in such subgroup for connecting the corresponding stations with said second finder, said second finder having access to said second trunk lines, said second trunk lines being common to all first finders of a line group, each first trunk line being connectible in said second finder with a plurality of said second trunk lines, each second trunk line being connectible in said third finder with a number of said common switching devices which corresponds at least to the number of said line groups.

7. A system and cooperation of parts according to claim 1, wherein said first trunk lines extending between said first and said second finders are disposed nearest to the subscriber stations of a subgroup, said first trunk lines being common to all stations included in such subgroup for connecting the corresponding stations with said second finder, said second finder having access to said second trunk lines, said second trunk lines being common to all first finders of a line group, each first trunk line being connectible in said second finder with at least two of said second trunk lines, each second trunk line extending to said third finder in which it is connectible with a number of said common switching devices which is greater than the number of first trunk lines.

8. A system and cooperation of parts according to claim 1, wherein said common switching devices are subdivided into subgroups, each such subgroup comprising a number of switching devices which is equal to the number of said second trunk lines.

9. A system and cooperation of parts according to claim 1, wherein said common switching devices are subdivided into subgroups, each such subgroup comprising a number of switching devices which is equal to the number of said second trunk lines, the number of second finders allotted to a line group differing at most by one from the number of subgroups included in said line group.

10. A system and cooperation of parts according to claim 1, comprising switching circuits for said allotter means, said switching circuits comprising blocking relays for making a first trunk line accessible only if such trunk line is connectible with an idle one of said common switching devices.

11. A system and cooperation of parts according to claim 1, comprising switching circuits for said allotter means, said switching circuits comprising blocking relays for making a first trunk line accessible only if such trunk line is connectible with an idle one of said common switching devices, and conductors for said blocking relays, said conductors by-passing said finders.

12. A system and cooperation of parts according to claim 1 wherein a first finder is allotted to each subgroup of subscriber stations, such first finder having access to said first trunk lines, coupling start relay means for governing the connection of said first trunk lines, switching circuits for said allotter means, said switching circuits comprising blocking relays for making a first trunk line accessible only if such trunk line is connectible with an idle one of said common switching devices, and contacts controlled by said blocking relays forming a starting chain for controlling said start relay means.

13. A system and cooperation of parts according to claim 1, wherein a first finder is allotted to each subgroup of subscriber stations, such first finder having access to said first trunk lines, switching control relays in said finders, coupling start relay means for governing the connection of said first trunk lines, circuit means controlled by said start relay means for governing the operation of said switching control relays, and circuit means controlled by said switching control relays for blocking a seized first trunk line and for preparing for the seizure of another first trunk line to be taken into use subsequently.

14. A system and cooperation of parts according to claim 1, comprising in said allotter means a blocking relay for each subgroup of stations, and means for energizing said blocking relay when all first finders in such subgroup have been seized for blocking seizure of a second trunk line.

15. A system and cooperation of parts according to claim 1, wherein each first trunk line has access to two groups of second finders, blocking relays for said second finders, said blocking relays governing the seizure of a first trunk line dependent on the availability of said common switching devices.

16. A system and cooperation of parts according to claim 1, comprising allotter means for each subgroup of subscriber stations for governing the seizure of idle first trunk lines, a test relay in said allotter means, circuit means for operating said test relay during the coupling of an idle first trunk line with a second finder, and means controlled by said test relay for inhibiting connection of a first trunk line in other subscriber subgroups which has access to finders included in the group of which the seized finder is a part.

17. A system and cooperation of parts according to claim 1, comprising allotter means for each subgroup of subscriber stations for governing the seizure of idle first trunk lines, a test relay in said allotter means, circuit means for operating said test relay during the coupling of an idle first trunk line with a second finder, a conductor which by-passes a successive finder, and circuit means controlled by said test relay for placing a potential on said conductor to inhibit connection of a first trunk line in other subscriber subgroups which has access to finders included in the group of which the seized finder is a part.

18. A system and cooperation of parts according to claim 1, comprising allotter means for each subgroup of subscriber stations for governing the seizure of idle first trunk lines, a test relay in said allotter means, circuit means for operating said test relay during the coupling of an idle first trunk line with a second finder, a conductor which by-passes a successive finder, said test relay having a high resistance winding, means for shunting said high resistance winding upon actuation of said test relay to place a potential on said conductor to inhibit connection of a first trunk line in other subscriber subgroups which has access to finders included in the group of which the seized finder is a part.

19. A system and cooperation of parts according to claim 1, comprising in said allotter means a blocking relay for each subgroup of stations, and circuit means for energizing said blocking relay when all first finders in such subgroup have been seized for blocking seizure of a second trunk line, said circuit means including contacts controlled by said common switching devices.

20. A system and cooperation of parts according to claim 1, comprising in said allotter means a blocking relay for each subgroup of stations, a winding of said blocking relay being disposed in a control conductor of a second trunk line which has access to said common switching devices, and means for energizing said blocking relay when all first finders in said subgroup have been seized for blocking seizure of a second trunk line.

References Cited in the file of this patent

UNITED STATES PATENTS

| | | |
|---|---|---|
| 1,251,955 | Betulander et al. | Jan. 1, 1918 |
| 1,269,181 | Herink | June 11, 1918 |
| 1,645,972 | Ronssean | Oct. 18, 1927 |
| 2,535,764 | Voss et al. | Dec. 26, 1950 |